US006618231B2

(12) United States Patent
McConaughy

(10) Patent No.: US 6,618,231 B2
(45) **Date of Patent: *Sep. 9, 2003**

(54) NEON SIGN TRANSFORMER MODULE AND RECEPTACLE

(75) Inventor: Drew B. McConaughy, Louisville, CO (US)

(73) Assignee: Zeon Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/083,772

(22) Filed: Feb. 27, 2002

(65) Prior Publication Data

US 2002/0086572 A1 Jul. 4, 2002

Related U.S. Application Data

(63) Continuation of application No. 09/767,623, filed on Jan. 24, 2001, which is a continuation of application No. 09/191,815, filed on Nov. 13, 1998, now Pat. No. 6,198,233.

(51) Int. Cl.[7] .................................................. H02H 9/00
(52) U.S. Cl. .......................... 361/91.1; 361/18; 361/38
(58) Field of Search ................................ 361/91.1, 115, 361/18, 38

(56) References Cited

U.S. PATENT DOCUMENTS

| | | | | |
|---|---|---|---|---|
| 1,601,204 A | | 9/1926 | Field | 307/64 |
| 2,487,468 A | | 11/1949 | Naysmith | 362/221 |
| 2,702,378 A | | 2/1955 | Talty | 439/620 |
| 2,793,330 A | | 5/1957 | Thommen | 361/268 |
| 3,243,659 A | | 3/1966 | Bostonian | 361/674 |
| 3,512,043 A | | 5/1970 | Jaaksoo | 361/35 |
| 3,514,590 A | | 5/1970 | Shaeffer | 362/382 |
| 4,151,576 A | | 4/1979 | Johnson | 361/35 |
| 4,409,536 A | | 10/1983 | Evjen | 320/110 |
| 4,414,489 A | | 11/1983 | Young | 315/51 |
| 4,645,283 A | | 2/1987 | MacDonald et al. | 439/236 |
| 4,651,059 A | | 3/1987 | Nilssen | 315/182 |
| 5,006,764 A | | 4/1991 | Swanson et al. | 315/276 |
| 5,260,678 A | | 11/1993 | Van Wagener et al. | 336/96 |
| 5,350,316 A | | 9/1994 | Van Wagener et al. | 439/460 |
| 5,426,347 A | * | 6/1995 | Nilssen | 315/209 R |
| 5,488,268 A | | 1/1996 | Bauer et al. | 315/70 |
| 5,510,762 A | | 4/1996 | Carey et al. | 336/192 |
| 5,559,393 A | * | 9/1996 | Nilssen | 315/58 |
| 5,640,069 A | * | 6/1997 | Nilssen | 315/209 R |
| 5,691,603 A | * | 11/1997 | Nilssen | 315/209 R |
| 5,745,321 A | | 4/1998 | Faure | 361/38 |
| 5,757,144 A | * | 5/1998 | Nilssen | 315/291 |
| 5,998,936 A | * | 12/1999 | Nilssen | 315/209 R |
| 6,198,233 B1 | * | 3/2001 | McConaughy | 315/291 |

* cited by examiner

*Primary Examiner*—Stephen W. Jackson
(74) *Attorney, Agent, or Firm*—Jay R Beyer

(57) ABSTRACT

A neon sign includes a removable transformer module and a receptacle attached to the neon sign for receiving the removable transformer module. The removable transformer module is configured to mate with the receptacle as the removable transformer module is plugged into the receptacle in order to connect the removable transformer module to the neon sign. The removable transformer module includes a transformer for transforming a primary input voltage into a secondary output having a voltage greater than the primary input. The removable transformer module also includes secondary contacts for connecting the secondary high voltage output of the transformer module to the neon sign when the removable transformer module is plugged into the receptacle. The receptacle also includes secondary contacts configured to mate with the secondary contacts of the removable transformer module as the removable transformer module is plugged into the receptacle thereby electrically connecting the secondary output of the transformer to the neon sign. The neon sign further includes a deactivating arrangement for deactivating at least the secondary contacts of the removable transformer module as a result of the removable transformer module being unplugged from the receptacle.

8 Claims, 6 Drawing Sheets

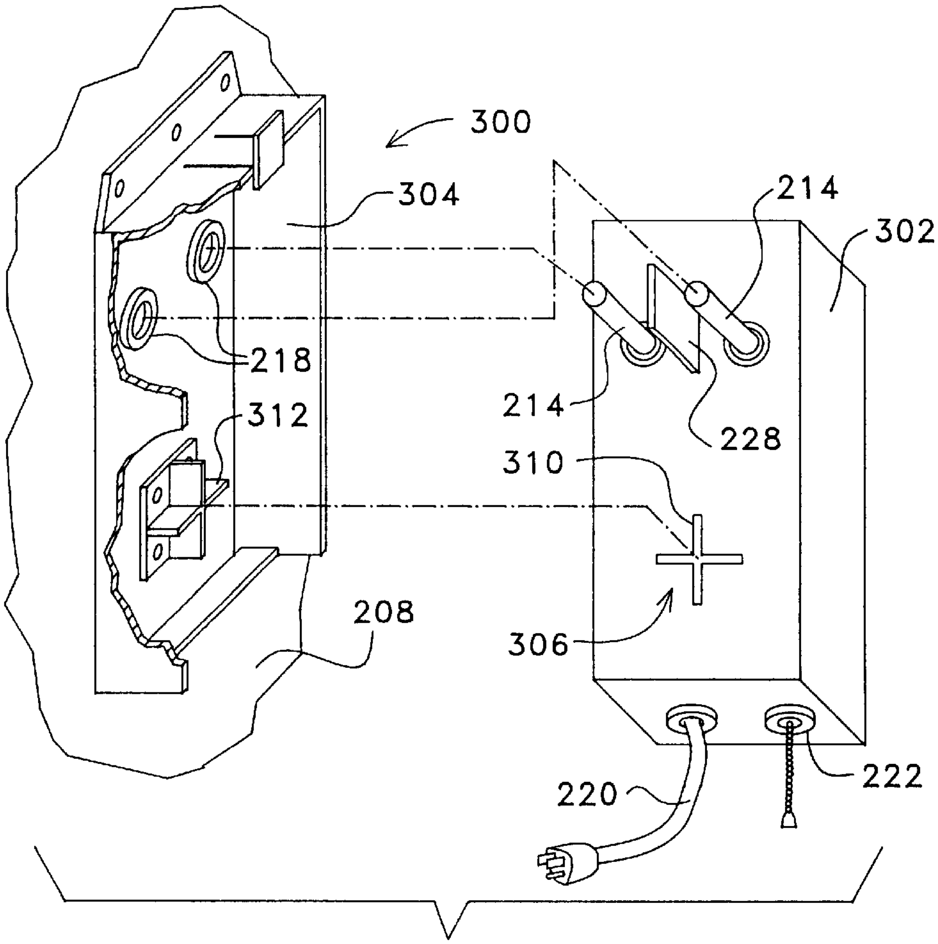
FIG. 6
FIG. 7
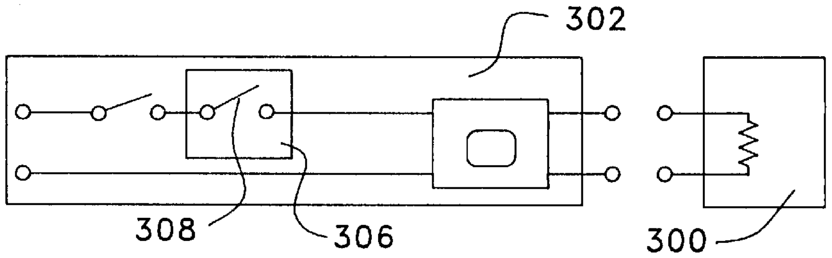
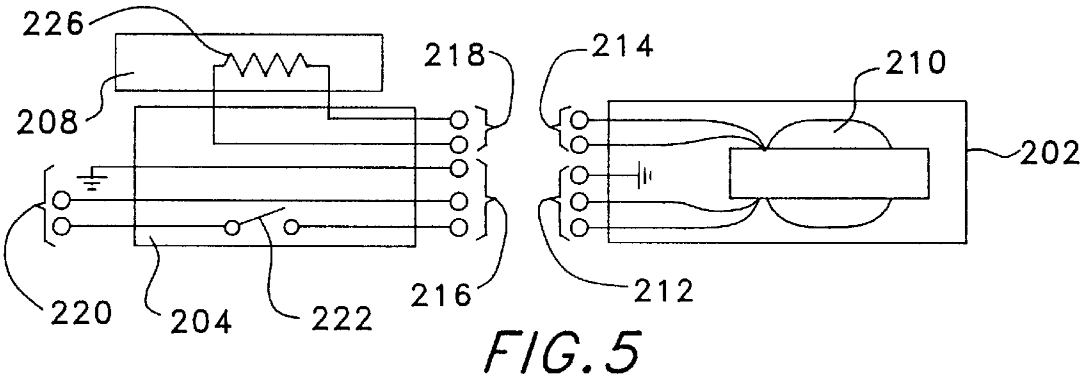
FIG. 5

NEON SIGN TRANSFORMER MODULE AND RECEPTACLE

This is a Continuation application of prior application Ser. No. 09/767,623, filed on Jan. 24, 2001 which is a continuation of prior application Ser. No. 09/191,815, filed on Nov. 13, 1998 now issued as U.S. Pat. No. 6,198,233 on Mar. 6, 2001.

BACKGROUND OF THE INVENTION

The present invention relates generally to neon sign transformers and power supplies and more specifically to neon sign transformer and power supply modules and mating receptacles for use in neon signs.

In the neon sign industry, the luminescent tubes of a neon sign are typically permanently attached to a back plane or other support structure. This is typically the case because the neon tubes have a very long life span compared to other light sources such as incandescent or fluorescent light bulbs. Due to this long life, neon tubes typically do not require much servicing and can therefore be substantially fixed in place on the neon sign.

Although the luminescent tubes of a neon sign are referred to herein as being neon tubes, it should be understood that neon signs utilize a variety of types of luminescent tubes filled with a variety of gases including, but not limited to, neon gas. All of these various combinations of tube types and gas types are well known to those skilled in the neon sign art and are commonly referred to as neon even though they may not include any neon gas. Therefore, it should be understood that the general term “neon sign”, as used hereinafter, refers to all of these various combinations of types of luminescent tubes and types of gases that are used in what is commonly referred to as neon signs. Also, the term “neon sign”, as used hereinafter, refers to any neon installation including, but not limited to, window signs, point of purchase signs, displays, architectural borders, soffit lighting, channel letters, accents, outdoor neon signs, or any other application that utilizes a neon tube. The term “neon tube”, as used hereinafter, refers to any processed and sealed luminescent tube that utilizes any combination of the above mentioned types of gases.

Neon signs require high voltage transformers or power supplies to drive the neon tubes of the neon sign. Traditionally, these high voltage transformers are provided in the form of “core and coil” type transformers. These core and coil transformers have proved to be relatively reliable and relatively long lived. Because of this, the high voltage transformers required by the neon sign have typically been fairly permanently attached to the neon sign and hardwired to the neon tube. In the past, this has not been much of a problem to the neon sign industry because the transformers and the neon tubes did not need to be serviced very often. Also, in the case of conventional large outdoor neon signs, it has been perfectly acceptable that a qualified technician capable of rewiring a neon tube or transformer was required in order to service the neon sign.

However, in the specific area of small window neon signs and point of purchase neon signs, permanently attaching a core and coil transformer to the small neon sign presents special problems. In the window and point of purchase neon sign industry, it is becoming more important to be able to ship individual small neon signs directly to a customer. This is very difficult to do with a small neon sign using a core and coil transformer hardwired to the sign. This is because the weight of the core and coil transformer causes an unacceptable amount of breakage of the neon tubes during shipping. Therefore, there is a need for an easily detachable neon sign transformer that can be shipped separately from the sign and then attached to the sign by the customer without requiring the involvement of a qualified technician or electrician.

As mentioned above, neon signs require high voltage transformers to power the neon tubes. This poses safety concerns in situations in which an inexperienced user is expected to connect a high voltage transformer to a neon sign. Due to these safety concerns, prior art detachable neon transformers have been designed to be installed and serviced only by qualified personnel such as an electrician.

On example of such a transformer is a channel letter transformer designated by reference numeral 100 and illustrated in FIG. 1. In this case, transformer 100 is transformer model PBKM-751 series provided by France. This transformer is designed to slide onto the electrodes at the ends of a neon channel letter 102 of a large outdoor neon backlit sign. As illustrated in FIG. 1, transformer 100 includes a pair of secondary contacts 104 that provide high voltage power to neon channel letter 102. Transformer 100 also includes primary input wires 106 for providing power, at a conventional input voltage, to the transformer. Wires 106 are typically hardwired to a power source by a qualified installer or electrician when the channel letter is installed.

Transformer 100 transforms the conventional input voltage from wires 106 into the required high voltage, referred to herein as the secondary voltage. This secondary voltage is typically in the range of 1000 volts to 15000 volts for a neon sign depending on the length and type of the neon tube being powered. With this configuration, secondary contacts 104 are energized at the high voltage output of the transformer any time that wires 106 are electrically connected to an active power source. This presents a significant safety risk and is one of the major reasons this configuration is designed to be only installed and serviced by a qualified installer. For this reason, this configuration would be unacceptable for use in a small window neon sign or a point of purchase neon sign in which the customer was expected to connect the transformer to the neon sign. Also, because this configuration requires the transformer to be hardwired to a power source, this configuration requires a qualified installer to install the transformer.

In order to overcome some of the safety concerns with high voltage transformers, new requirements for ground fault interrupt (GFI) circuitry and open circuit detection circuitry have been becoming more common. In cases where this circuitry is required, the cost of providing a particular core and coil transformer may go up substantially. In the case of a small core and coil transformer for a small window neon sign or a small point of purchase neon sign, this detection circuitry may double the cost of providing the traditional core and coil type transformer. This increased cost is very significant for the window sign and point of purchase sign industry segment due to extreme price sensitivity in this industry segment and due to the fact that the transformer is the most expensive component of this type of neon sign.

Solid state power supplies or transformers are a relatively new alternative to traditional core and coil transformers in the neon sign industry. Because solid state power supplies are already constructed from electronic components typically mounted on a printed circuit board, it is relatively easy and cost effective to add GFI and open circuit detection circuitry to this type of transformer. Because of this substantial cost advantage, there is a strong trend toward the use of solid state power supplies in the window sign and point of purchase sign industry.

Unfortunately, the solid state power supplies currently available do not appear to be nearly as reliable as conventional core and coil transformers. This seems to be caused by the combination of several factors. First, a large number of electronic components are typically used to provide a solid state power supply. A failure of any one of these components can cause the power supply to fail. Second, the pressure to use low cost components in order to provide a low cost solid state power supply increases the chances that one of the components will fail. And finally, the inclusion of GFI and open circuit detection circuitry that may shut off the power supply, as the circuits are designed to do, may contribute to the general perception that a neon sign using a solid state power supply has failed.

In recent years, the increased failure rates of the solid state power supplies have been significantly impacting the reputation of neon signs. Previously, neon signs were thought to be very durable and long lived. However, due to the more frequent failures of solid state power supplies, which is perceived by the general public as a failure of the neon sign, small window and point of purchase neon signs have been gaining a reputation for being less reliable. Therefore, in order to minimize the inconvenience of servicing a neon sign using a solid state power supply, it is desirable to provide a power supply that may be quickly, safely, and easily replaced by a user in the field without requiring the involvement of a specially trained technician or electrician.

The present invention provides a safe and very easy to replace high voltage transformer or power supply module for a neon sign that may be easily plugged into and unplugged from a neon sign. The transformer or power supply module may include any type of high voltage neon transformer or power supply including, but not limited to, core and coil type transformers and solid state power supplies. All of these various transformer or power supply modules are hereinafter referred to as transformer modules even if they include a solid state power supply. A receptacle that is designed to be attached to the neon sign for mating with and receiving the transformer module is also provided.

SUMMARY OF THE INVENTION

As will be described in more detail hereinafter, a neon sign including a removable transformer module and a receptacle for receiving the removable transformer module is disclosed. The removable transformer module is configured to mate with the receptacle as the removable transformer module is plugged into the receptacle in order to connect the removable transformer module to the neon sign. The removable transformer module includes a transformer for transforming a primary input voltage into a secondary output having a voltage greater than the primary input. The removable transformer module also includes secondary contacts for connecting the secondary high voltage output of the transformer module to the neon sign when the removable transformer module is plugged into the receptacle. The receptacle also includes secondary contacts configured to mate with the secondary contacts of the removable transformer module as the removable transformer module is plugged into the receptacle thereby electrically connecting the secondary output of the transformer to the neon sign. The neon sign further includes a deactivating arrangement for deactivating at least the secondary contacts of the removable transformer module as a result of the removable transformer module being unplugged from the receptacle.

BRIEF DESCRIPTION OF THE DRAWINGS

The features of the present invention may best be understood by reference to the following description of the presently preferred embodiments together with the accompanying drawings in which:

FIG. 5 is a schematic representation of the wiring configuration of the transformer module and receptacle of FIG. 3.

FIG. 6 is a diagrammatic perspective partially cut away view of a neon sign including a second embodiment of a transformer module and receptacle designed in accordance with the invention with the transformer module unplugged from the receptacle.

FIG. 7 is a schematic representation of the wiring configuration of the transformer module and neon sign of FIG. 6.

DETAILED DESCRIPTION OF THE PREFERRED EMBODIMENTS

An invention is described for providing a neon sign including a transformer module and a receptacle for mating with and receiving the transformer module. It should be understood that the term "transformer module", as used hereinafter, refers to a module that includes any type of high voltage neon transformer or power supply including conventional core and coil transformers and solid state power supplies. In the following description, numerous specific details are set forth in order to provide a thorough understanding of the present invention. It will be obvious, however, to one skilled in the art, that the present invention may be embodied in a wide variety of specific configurations. Also, well known processes such as methods of manufacturing neon signs and neon sign transformers or power supplies have not been described in detail in order not to unnecessarily obscure the present invention.

Figure 1:
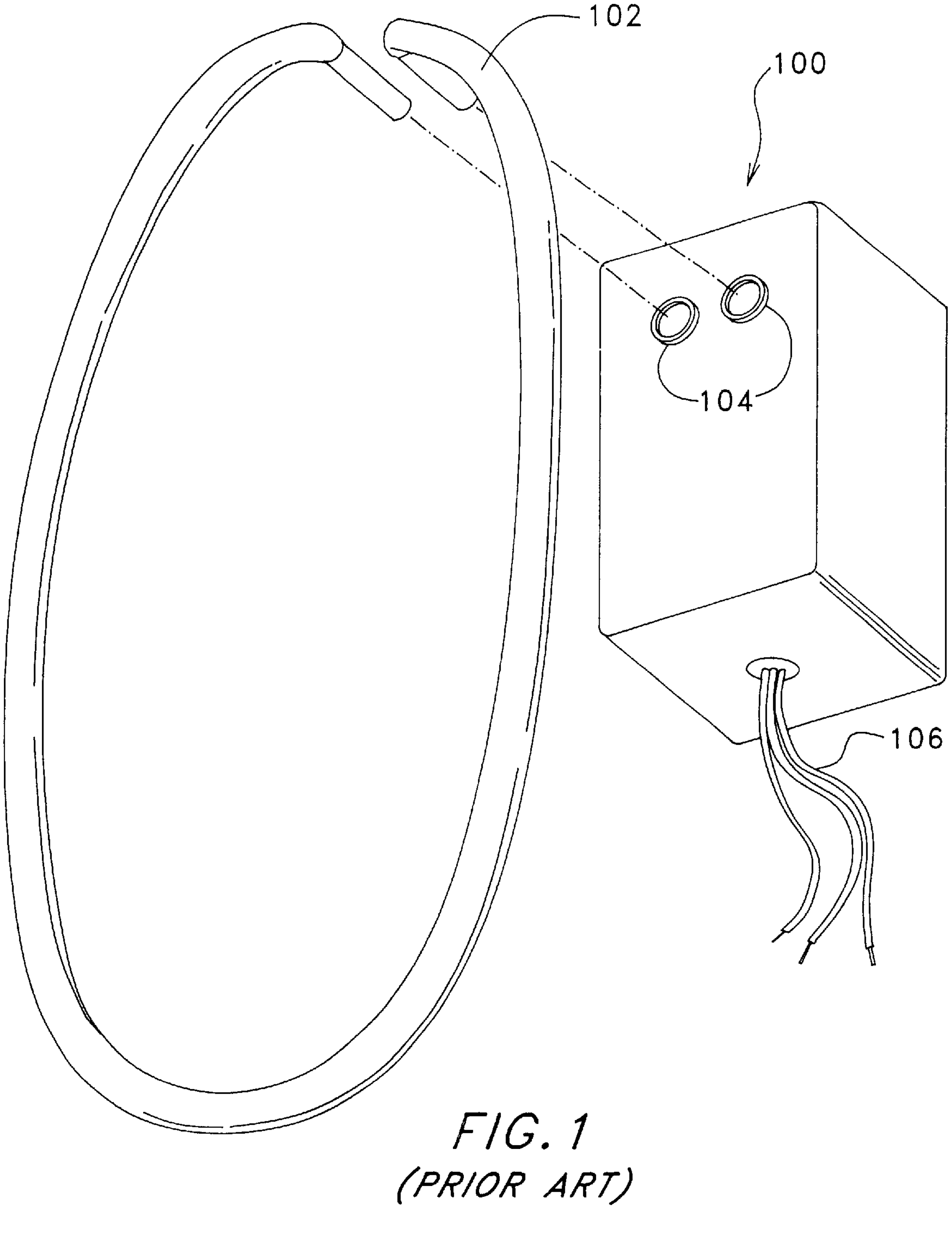
FIG. 1 (PRIOR ART)
FIG. 1 is a diagrammatic perspective view of a prior art, high voltage, neon channel letter transformer.
Figure 2:
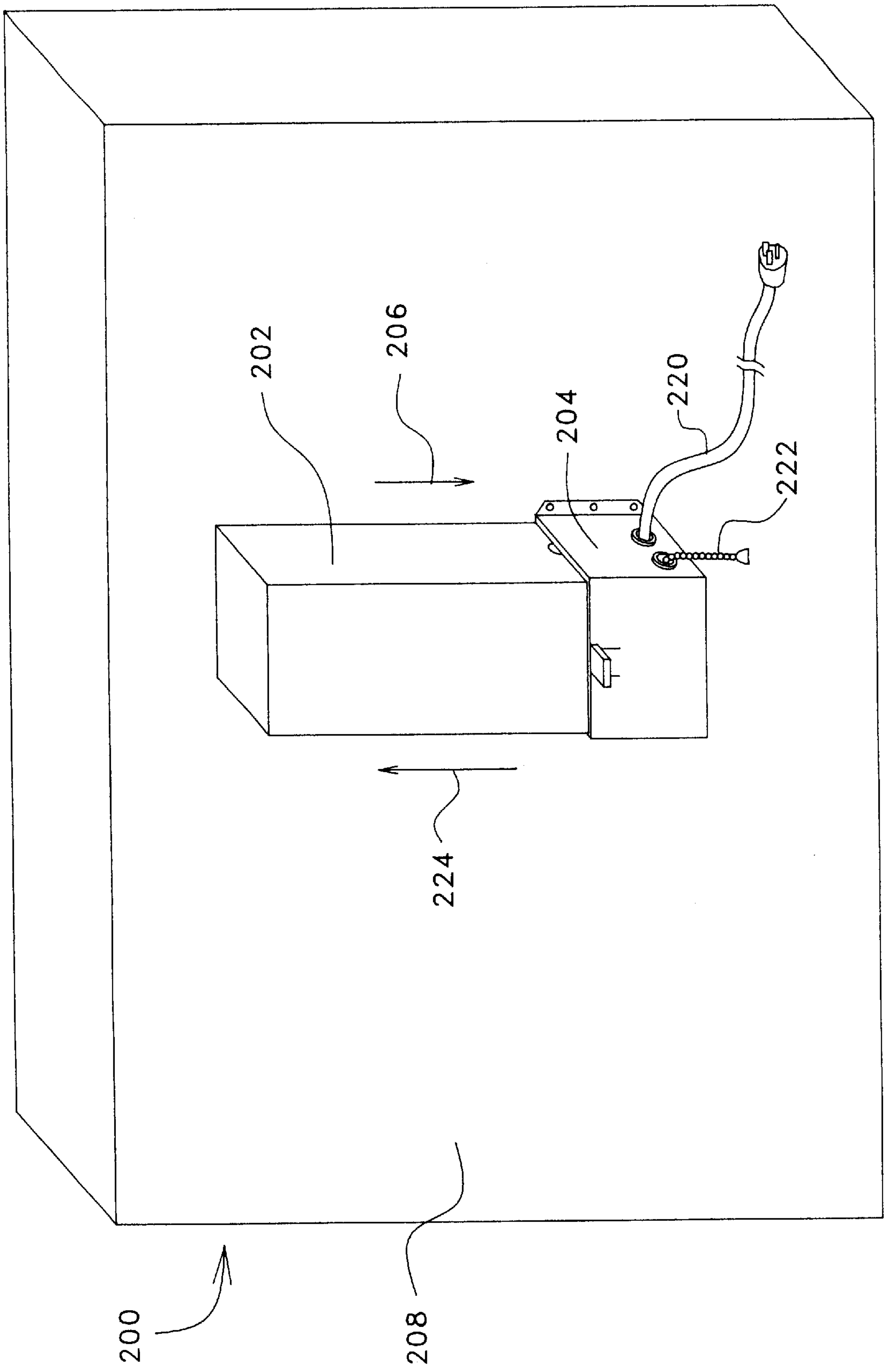
FIG. 2 is a diagrammatic perspective view of a first embodiment of a neon sign including a transformer module and receptacle designed in accordance with the invention with the transformer module plugged into the receptacle.

Turning to FIGS. 2–9, wherein like components are designated by like reference numerals throughout the various figures, attention is initially directed to FIG. 2. This figure is a perspective view of the back of a first embodiment of a neon sign 200 designed in accordance with the invention. As will be described in more detail hereinafter, neon sign 200 includes a transformer module 202 and a receptacle

204 that is attached to neon sign 200. . Receptacle 204 is configured to mate with and receive transformer module 202 as the transformer module is plugged into receptacle 204 as indicated by arrow 206 in order to connect transformer module 202 to neon sign 200.

In FIG. 2, neon sign 200 is illustrated as a window neon sign including a backplane 208, in this case made from a sheet of plastic material, on which receptacle 204 is mounted. As is the case for conventional neon window signs, this backplane is also typically the supporting member for the rest of the components making up the neon sign including the neon tubes. Although neon sign 200 is shown as a window sign having a plastic backplane, this is not a requirement of the invention. Instead, it should be understood that neon sign 200 may be any type of neon sign as indicated above in the background of the invention and that the backplane may be formed in a wide variety of ways from a variety of different materials and still remain within the scope of the invention. For example, in the case of small point of purchase signs such as beer signs, the backplane is often provided as a metal grid or skeleton.

Figure 3:
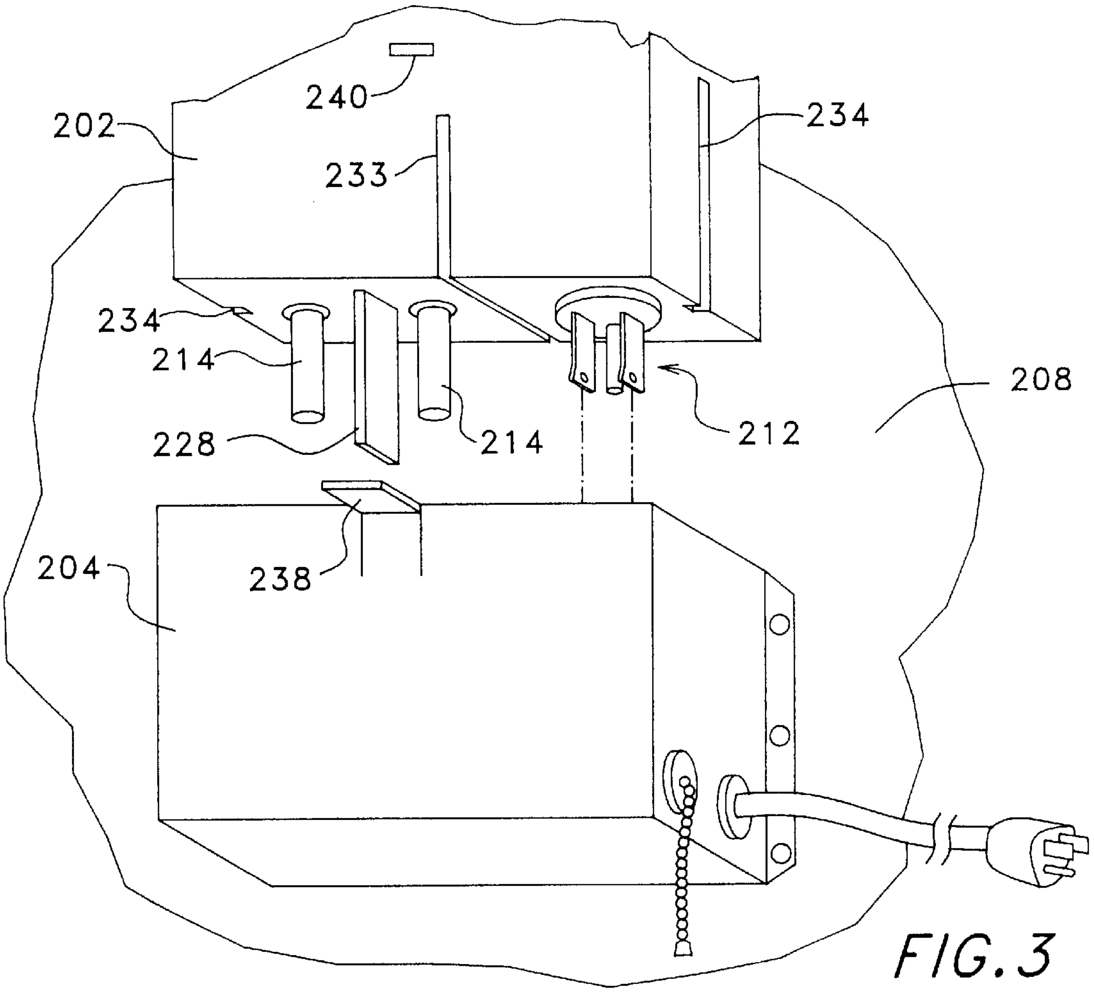
FIG. 3 is a diagrammatic perspective partially cut away view of the neon sign of FIG. 2 with the transformer module unplugged from the receptacle.
Figure 4:
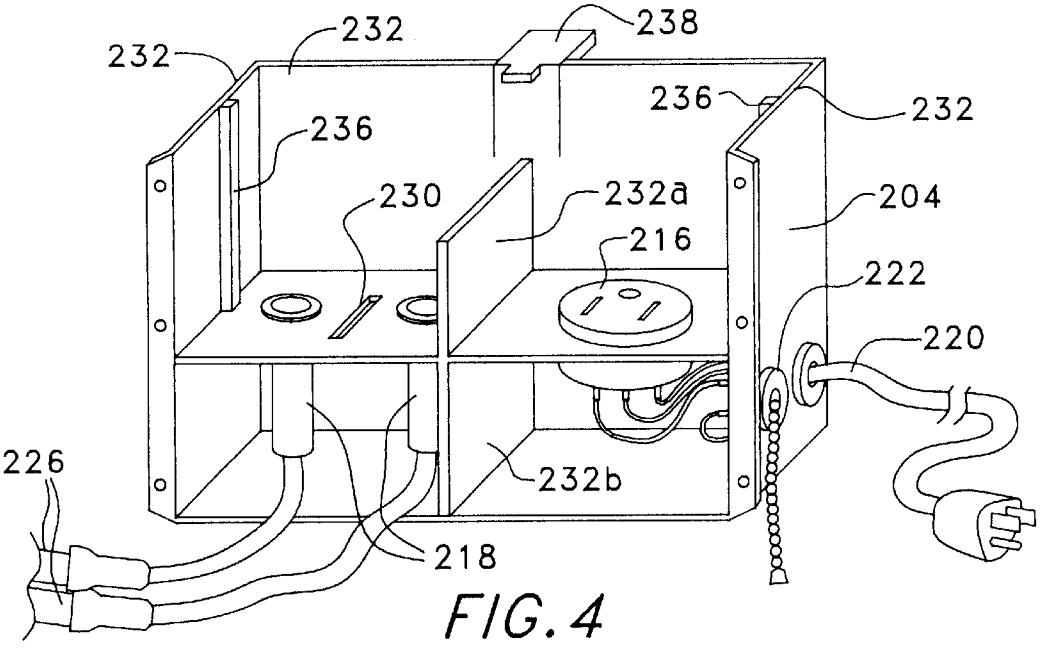
FIG. 4 is a diagrammatic perspective view of the inside of the receptacle of FIGS. 2 and 3.

Referring now to FIGS. 2–5, a first embodiment of a transformer module 202 and receptacle 204 will be described. FIG. 3 is a close up, partially cut away view of the bottom end of transformer module 202, receptacle 204, and a small portion of neon sign backplane 208. This figure illustrates transformer module 202 as it is being plugged into receptacle 204 as indicated by arrow 206 of FIG. 2. FIG. 4 is a perspective view of receptacle 204 showing the configuration of the components making up receptacle 204. FIG. 5 is a simple schematic illustrating the electrical configuration of this embodiment. In accordance with the invention, and as will be described in more detail hereinafter, the act of plugging transformer module 202 into receptacle 204 makes the electrical connections between transformer module 202 and neon sign 200. In preferred embodiments, this act of plugging transformer module 202 into receptacle 204 also mechanically connects transformer module 202 to receptacle 204 and therefore to neon sign 200.

In the embodiment shown in FIG. 3 and schematically shown in FIG. 5, transformer module 202 includes a high voltage transformer or power supply 210, primary contacts 212, and secondary contacts 214. High voltage transformer 210 may be any type of conventional neon high voltage transformer including core and coil transformers or solid state power supplies. As is the case in conventional neon signs, high voltage transformer 210 is configured to transform a primary input voltage into a secondary high voltage output.

In this embodiment, secondary contacts 214 are provided in the form of a thermoplastic post with a brass contact cap. This contact may be custom configured using various post and electrical contact materials. Alternatively, these contacts may be any conventional, off-the-shelf parts suited for the application. Primary contacts 212 are provided as a conventional three-prong plug also protruding out from transformer module 202. Alternatively, these primary contacts may be custom configured or could utilize any conventional off-the-shelf plug and receptacle systems that are suitable for the application.

As best shown in FIG. 4, receptacle 204 includes mating primary contacts 216 and mating secondary contacts 218 for respectively mating with primary contacts 212 and secondary contacts 214 of transformer module 202 when transformer module 202 is plugged into receptacle 204. Receptacle 204 also includes a conventional plug in line cord 220 for providing a primary input voltage to primary contacts 216 and a pull chain switch 222 for switching the neon sign on and off. In this embodiment, secondary contacts 218 are provided in the form of female contacts designed to receive the secondary contacts 214 protruding out from transformer module 202. Primary contacts 216 of receptacle 204 are provided as a conventional three-prong socket or electrical outlet.

Now that the basic components making up this embodiment of neon sign 200 have been described, the electrical configuration of this embodiment will be described assuming transformer module 202 is plugged into receptacle 204 and line cord 220 is plugged into an active, conventional, grounded electrical outlet. As shown best in FIGS. 4 and 5, line cord 220 is electrically connected to primary contacts 216 through pull chain switch 222. With this configuration, primary contacts or electrical outlet 216 are activated any time that pull chain switch 222 is switched on and line cord 220 is plugged into an active electrical outlet.

Primary contacts 212 and secondary contacts 214 of transformer module 202 are respectively electrically connected to the primary input and the secondary output of high voltage transformer 210 as illustrated in FIG. 5. With this configuration, secondary contacts 214 of transformer module 202 are activated at the high voltage secondary output voltage of transformer 210 any time that transformer module 202 is plugged into receptacle 204. This is the case so long as line cord 220 is plugged into an active electrical outlet and pull chain switch 222 is switched on. As also shown in FIG. 5, with transformer module 202 plugged into receptacle 204, secondary contacts 214 of transformer module 202 are connected to secondary contacts 218 of receptacle 204. Secondary contacts 218 of receptacle 204 are in turn electrically connected to a neon tube 226 as illustrated in both FIGS. 4 and 5. Therefore, when switch 222 is switched on and line cord 220 and transformer module 202 are plugged in, transformer 210 provides high voltage power to neon tube 226 thereby lighting neon sign 200.

However, in accordance with the invention, as soon as transformer module 202 is unplugged from receptacle 204, as indicated by arrow 224 in FIG. 2, secondary contacts 214 of transformer module 202 are deactivated. This is the case even if switch 222 is left on and line cord 220 is left plugged into an active electrical outlet. In accordance with the invention, the configuration of transformer module 202 and receptacle 204 insures that mating primary contacts 212 of transformer module 202 and primary contacts 216 of receptacle 204 are disconnected when transformer module 202 is unplugged from receptacle 204. This arrangement insures that the secondary contacts of the transformer module of the present invention are deactivated any time that the transformer module is unplugged from the receptacle thereby providing an important safety feature.

As described above in the background, the secondary high voltage output of a neon sign transformer typically ranges from about 1000 volts to about 15000 volts. This high voltage presents a significant shock hazard if improperly handled. This is one of the main reasons neon signs have traditionally required servicing by qualified technicians. However, by providing an arrangement that deactivates the secondary contacts of the transformer module any time that the transformer module is unplugged from the sign, the risk of shock is virtually eliminated.

In the embodiment illustrated in FIG. 3, the primary contacts are shorter than the secondary contacts. This configuration causes the primary contacts of the transformer module to be disconnected from the primary contacts of the receptacle before the secondary contacts of the transformer module are disconnected from the secondary contacts of the receptacle when the transformer module is unplugged from the receptacle. Because the primary contacts are disconnected first, this configuration ensures that the secondary contacts are deactivated before the secondary contacts of the transformer module are disconnected from the secondary contacts of the receptacle.

The transformer module and receptacle of the present invention provide several advantages over traditional neon sign transformers that are hardwired to the neon sign. First, because the transformer module is so easily unplugged and plugged into the receptacle, the transformer may be shipped separately from the sign. This is very important in the case of a small window sign or point of purchase sign that is to be shipped individually. As described above in the background, if a heavy core and coil transformer is shipped attached to a small neon sign, there is a substantial risk that the weight of the transformer will damage the neon sign, or break the neon tubes during shipping. By using a transformer module in accordance with the invention that includes a core and coil transformer, the transformer module may be separated from the sign during shipping thereby substantially reducing the risk of shipping damage.

In another advantage, a transformer module designed in accordance with the invention may be very easily replaced by simply unplugging the old transformer module and replacing it with a new transformer module. Additionally, the extreme ease of replacing the transformer module allows the transformer module to be replaced without requiring a qualified technician to perform the replacement. This substantially reduces the costs associated with servicing a small neon sign.

Furthermore, because the configuration of the transformer module and the receptacle ensures that the secondary contacts of the transformer module are deactivated when the transformer module is unplugged from the receptacle, a transformer module designed in accordance with the invention may be safely replaced without worrying about whether or not the power to the neon sign has been shut off or not. In other words, the present invention allows the safe replacement of a high voltage neon sign transformer designed in accordance with the invention while the power to the sign remains on.

This ability to swap transformers while power is on is a substantial advantage in a wide variety of neon sign applications. For example, in the case of a large outdoor conventional neon sign that requires servicing, a sign technician may often spend a long time trouble shooting the problem with the sign. In a conventional neon sign installation in which the transformers are hardwired to the sign, the trouble shooting process may include having to switch off the power to the sign in order to unwire a transformer, hardwiring a new transformer, and switching the power back on to see whether or not the problem was caused by the transformer. This can be very time consuming and therefore very costly. The present invention dramatically reduces this time requirement and cost by providing the ability to swap transformer modules while the power remains on by simply unplugging the old transformer and plugging in a new transformer.

The easy interchangeability of the transformer modules of the invention provide several additional benefits. In some neon sign installations, there are sight specific problems that may effect the requirements for the transformer used for the installation. For example, the immediate surroundings of a neon sign can have a substantial impact on the operation of the neon sign. In an installation where there is a lot of metal around the neon sign, there may be sight specific capacitance problems that effect the operation of the neon sign. In this type of installation, a higher voltage transformer may be required to overcome the sight specific problem. The present invention allows the transformer to be quickly and easily replaced with a higher voltage transformer without even requiring the power to be switched off.

The above described interchangeability also allows the transformer module to be changed to different styles or types of transformer modules without requiring the transformer to be unwired from the sign. For example, in an indoor, dark environment, the transformer of a standard brightness neon sign may be easily swapped with a transformer that results in a dimmer sign. This same approach may be used to easily exchange transformer modules to provide flashing signs, 240 volt input voltage versus 120 volt input voltage signs, low voltage inputs (i.e. 12 V or 24 V), solid state versus core and coil type transformers, or a variety of other optional configurations.

Additionally, because the receptacle of the invention provides the electrical connection to the neon tubes, these electrical connections do not need to be tampered with when exchanging transformers. This avoids the potential for damage to the neon tubes that may be caused in a conventional configuration due to the requirement of unwiring a conventional transformer from the neon tube electrodes. This is especially significant in a large custom neon sign application in which the custom neon tubes are very expensive and difficult to replace if broken.

In another advantage, the present invention helps insure that only the proper transformer modules are used for a given application. This is because the receptacle ensures that only a mating transformer module may be plugged into the receptacle. With this arrangement, the receptacles may by keyed such that only specific types of transformer modules may be plugged into the receptacle of a particular type of neon sign.

As mentioned above, the transformer of small window neon signs or point of purchase neon signs is typically the most expensive component of the sign. Also, in order to continuously offer a fresh look, the designs of this type of signage is often updated or modified. The present invention allows the transformer modules of this type of sign to be easily unplugged so that a working transformer module of an outdated small neon sign may be used in a new updated sign. In other words, this arrangement allows the neon sign backplane, receptacle, and neon tubes to be replaced while reusing the most expensive component of the sign, the transformer module. This substantially reduces the costs of updating the look of neon point of purchase or window signs.

As mentioned above in the background, it is becoming more common that open circuit detection circuitry is required in neon sign transformers. In these, the arrangement described above for transformer module 202 that insures that the primary contacts are disconnected before the secondary contacts are disconnected provides an additional benefit. Because the secondary contacts and the open circuit detection circuit are deactivated when the primary contacts are disconnected, this configuration prevents the triggering of the open circuit detection circuit. This avoids the need to reset the open circuit detection circuit by switching off and on the pull chain switch every time the transformer module is unplugged. If this were not the case, and if the secondary contacts were disconnected first, the open circuit detection circuit would trigger and the transformer module would not work until the open circuit detection circuit was reset.

In the case of solid state power supplies, an easily replaceable transformer module as described above makes it much easier to deal with transformer failures. As described above in the background, because solid state power supplies have developed a reputation for being fairly unreliable, the easy replacement of the transformer module in accordance with the invention reduces the inconvenience to the end user when a transformer failure occurs.

Although primary and secondary contacts 212, 214, 216, and 218 have been described as specific types of contacts, it should be understood that these contacts may take a wide variety of forms and still remain within the scope of the invention so long as the secondary contacts of the transformer module are deactivated when the transformer module is unplugged from the receptacle. For example, although the secondary contacts of the transformer module have been described as contact studs that protrude from the module and the secondary contacts of the receptacle have been described as female contacts configured to receive the transformer module secondary contacts, this is not a requirement. Instead the transformer module may use female contacts and the receptacle may be provided with mating male contacts.

Furthermore, it should be understood the transformer module of the present invention may be constructed from any conventional neon sign transformer components. For example, the transformer module may include ground fault detection and open circuit detection circuitry if desired. Also, as mentioned above, the transformer module of the invention may include any type of neon sign transformer including core and coil transformers and solid state power supplies.

Still referring to FIGS. 3 and 4, a receptacle and transformer module designed in accordance with the invention may include additional safety features. As shown in FIG. 3, secondary contacts 214 of transformer module 202 may be spaced apart by an appropriate distance that helps ensure that no electrical arcing occurs between contacts 214 as transformer module 202 is unplugged from receptacle 204. In a specific example, secondary contacts 214 are spaced apart by a distance D of about one inch. Additionally, transformer module 202 may include a separating partition or fin 228. In this case, separating fin 228 is located between two secondary contacts 214. Fin 228 is made from an electrical insulting material and is positioned to help prevent any electrical arcing between secondary contacts 214 as transformer module 202 is unplugged from receptacle 204. For this embodiment, receptacle 204 includes an opening 230 for receiving fin 228 when transformer module 202 is plugged into receptacle 204.

As shown best in FIG. 4, the primary contacts and secondary contacts of receptacle 204 may be recessed within receptacle 204. That is, receptacle 204 may include sidewalls 232. Sidewalls 232 are configured to ensure that there is no access to secondary contacts as transformer module 202 is plugged into receptacle 204. This helps to eliminate the risk of shock while installing the transformer module even if the line cord is plugged in and the sign is switched on. Sidewalls 232 may include sidewalls 232*a* and 232*b* that separate or compartmentalize primary contacts 216 and secondary contacts 218. If this is the case, transformer module 202 would include a slot 233 for mating with sidewall 232*a*.

Other features may also be included with the design of receptacle 204 and transformer module 202. For example, slots 234 may be included in transformer module 202 and mating guides may be formed on receptacle 204. These slots and mating guides may be used as a key to ensure that transformer module 202 is properly installed into receptacle 204. Receptacle 204 may also include an arrangement for locking transformer module 202 in place once it is fully inserted into receptacle 204. In the embodiment shown, a portion of sidewall 232 includes a snap arrangement 238 for engaging an depression 240 in transformer module 202. Although a snap arrangement is shown, it should be understood that any conventional arrangement for holding transformer module 202 engaged with receptacle 204 may be utilized. This may include conventional fasteners, other snapping arrangements, or any other suitable retaining arrangement.

Although the transformer module and receptacle of the invention have been described as including primary contacts that mate with one another, this is not a requirement of the invention. Instead, the transformer module and mating receptacle may take a wide variety of forms so long as the secondary contacts of the transformer module are deactivated an time that the transformer module is unplugged from the receptacle.

Referring now to FIGS. 6 and 7, another embodiment of a neon sign 300 in accordance with the invention will be described. FIG. 6 illustrates a transformer module 302 and mating receptacle 304 designed to be attached to neon sign 300. FIG. 7 is a simple schematic showing the electrical configuration of this embodiment.

In this embodiment, transformer module 302 includes transformer 210 and secondary contacts 214 similar to those described above for FIG. 3. However, in this embodiment, transformer module 302 includes line cord 220 and a pull chain switch 222 similar to line cord 220 and pull chain switch 222 used on receptacle 204 of FIG. 4. Additionally transformer module 302 includes at least part of a deactivating arrangement 306 for deactivating secondary contacts 214 any time that transformer module 302 is disconnected from receptacle 304. As best shown in FIG. 7, deactivation arrangement 306 includes a deactivation switch 308 for deactivating secondary contacts 214. Also, transformer module 302 includes a keyed opening 310.

As described above for receptacle 204, receptacle 304 is attached to neon sign back plane 208 of neon sign 300 and includes mating secondary contacts 218. However, in this embodiment, receptacle 304 does not include primary contacts 216, line cord 220, or switch 222. Instead, line cord 220 and pull chain switch 222 are provided as part of transformer module 302. Also, receptacle 304 includes a keyed protrusion 312 designed to mate with keyed opening 306 of transformer module 302. Deactivating switch 308 is positioned adjacent to keyed opening 306 in transformer module 302 such that switch 308 is actuated by keyed protrusion 312 when transformer module 302 is plugged into receptacle 304 such that keyed protrusion 312 mates with keyed opening 310. With this configuration, line cord 220 is electrically connected to the primary input of transformer 210 through pull chain switch 222 and deactivating switch 308 as shown in FIG. 7. This configuration insures that secondary contacts 214 of transformer module 302 are deactivated any time that transformer module 302 is unplugged from receptacle 304. This is the case even if line cord 220 is plugged into an active electrical outlet and pull chain switch is switched on.

As described above for receptacle 204, receptacle 304 may include a variety of other safety features. These include sidewalls for ensuring that there is no access to the secondary contacts as the transformer module is plugged in and unplugged from the neon sign. Receptacle 304 may also include a fastening arrangement for holding transformer module 302 in place once fully installed. Transformer module 302 or receptacle 304 may include a partition or fin 228 separating the secondary contacts in order to prevent any electrical arcing between the secondary contacts as transformer module 302 is plugged in and unplugged from receptacle 304. Also, as illustrated in FIG. 6 and in a manner similar to that described above for FIG. 3, keyed protrusion 312 may be configured such that it causes deactivating switch 308 to deactivate secondary contacts 214 before secondary contacts 214 are disconnected from secondary contacts 218 of receptacle 304 when transformer module 302 is unplugged from receptacle 304.

Figure 8:
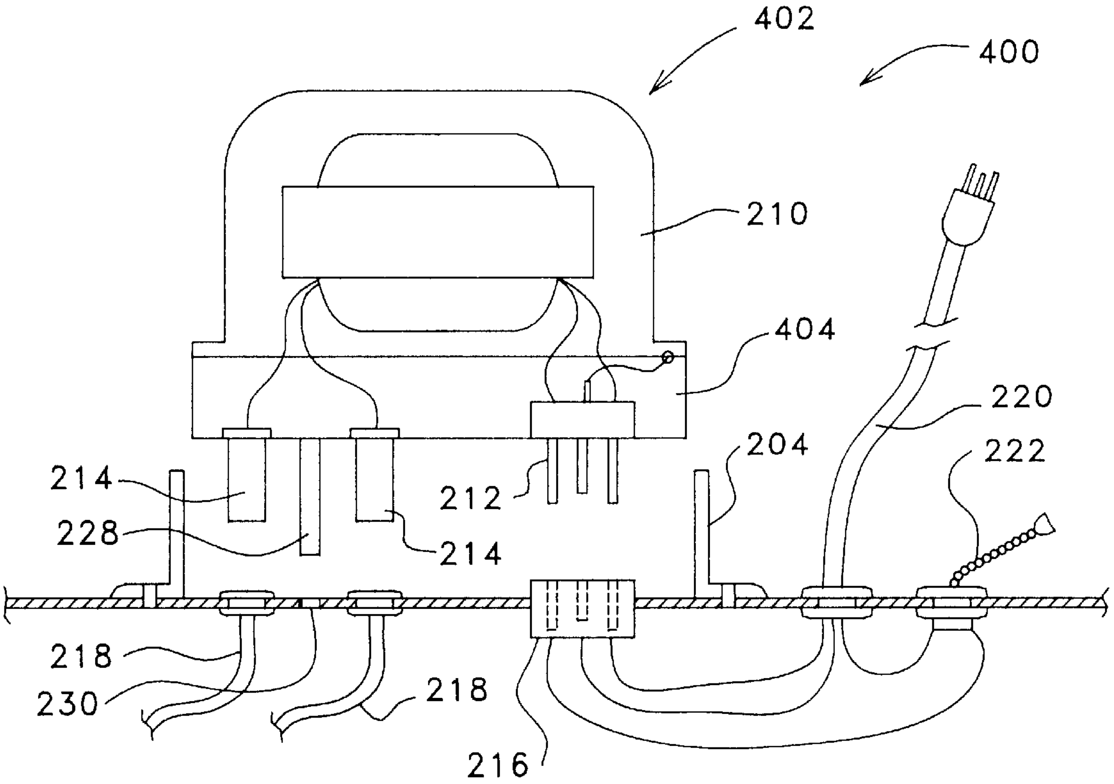
FIG. 8 is a partially cut away cross sectional view of another embodiment of a neon sign including a transformer adapter and a receptacle designed in accordance with the invention.
Figure 9:
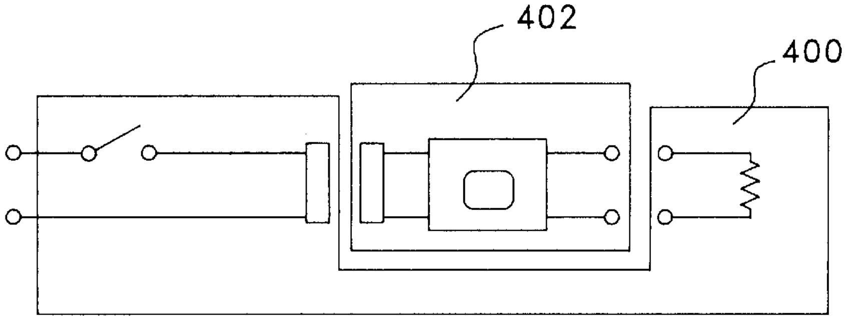
FIG. 9 is a schematic representation of the wiring configuration of the transformer, the transformer adapter, and the neon sign of FIG. 8.

Referring to FIGS. 8 and 9, another embodiment of the invention will be described. FIG. 8 is a partial cross sectional view of a portion of a neon sign 400. In this embodiment, neon sign 400 includes a transformer module 402 similar to transformer module 202 of FIG. 3. However, in this case, transformer module 402 is made up of a conventional neon sign transformer 210 and a transformer adapter 404. Transformer adapter 404 includes secondary contacts 214 and primary contacts 212 similar to those described for transformer adapter 202. Overall transformer module 402 is formed by attaching conventional neon sign transformer 210 to transformer adapter 404 such that secondary contacts 214 are connected to the secondary output of transformer 210 and primary contacts 212 are connected to the primary input of transformer 210. With this configuration, overall transformer module functions in an identical manner to transformer module 202.

As described above for FIG. 3, neon sign 400 includes a receptacle 204 including primary contacts 216 and secondary contacts 218. Line cord 220 is connected to primary contacts 216 through pull chain switch 222. As described above and in accordance with the invention, this configuration ensures that secondary contacts 214 of transformer module 402 are deactivated any time that transformer module 402 is disconnected from the receptacle.

Figure 10:
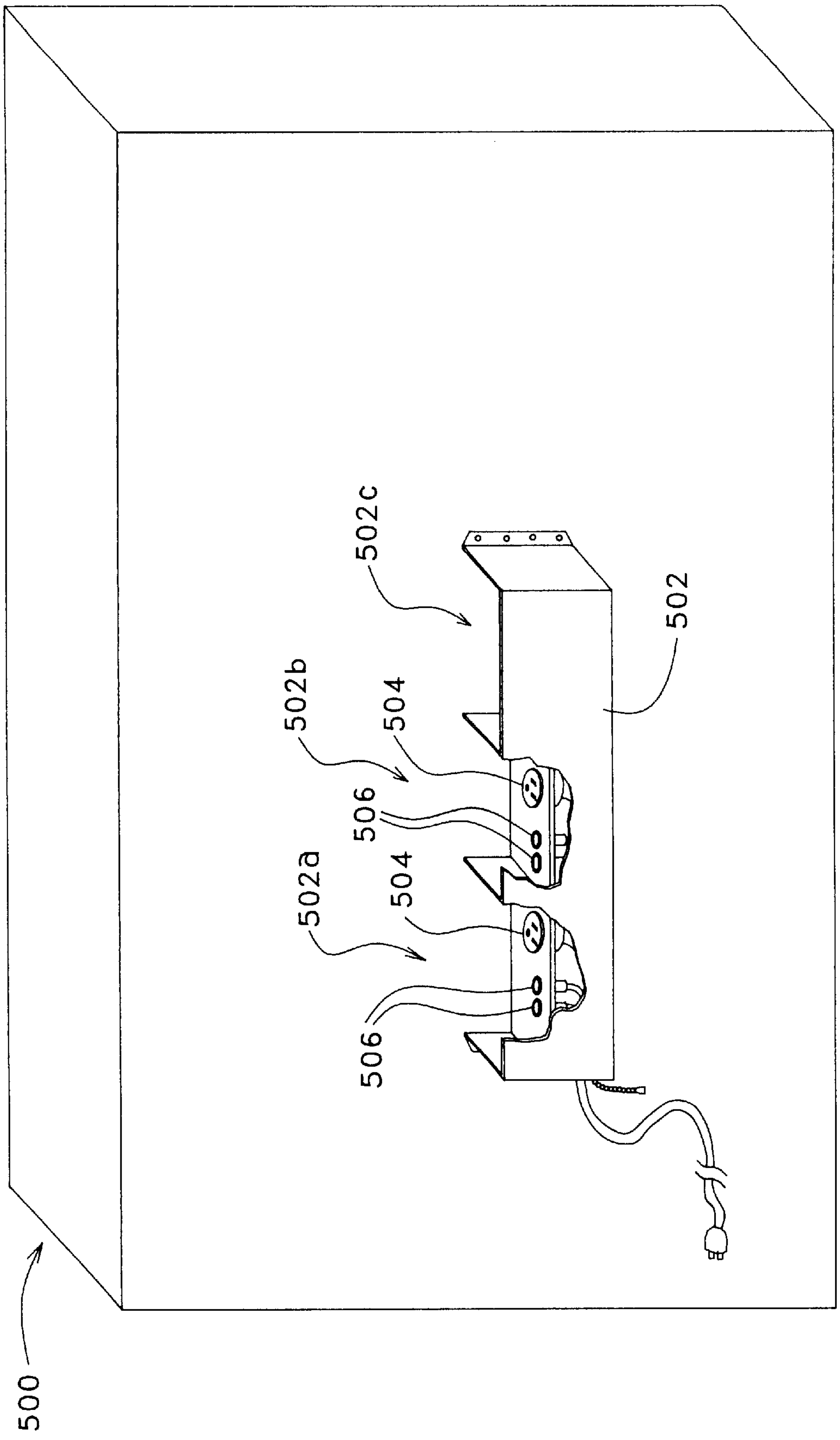
FIG. 10 is a diagrammatic perspective view of another embodiment of a neon sign including a receptacle designed in accordance with the invention and designed to receive multiple transformer modules.

Although only three specific embodiments of transformer modules and receptacles have been described in detail, the invention is not limited to these specific configurations. For example, the receptacle of the neon sign may be designed to receive multiple transformer modules that are arranged to power various portions of an overall neon sign. FIG. 10 illustrates a neon sign 500 including a receptacle designed to receive multiple transformer modules (not shown). In the embodiment shown, receptacle 502 includes three receptacle portions or bays 502*a*, 502*b*, and 502*c* for receiving three separate transformer modules. Each transformer module may be provided with its own power cord and secondary contacts as described above for transformer module 302 of FIG. 6. Alternatively, each of the transformer modules may be configured with primary and secondary contacts similar to those described above for transformer module 202 of FIG. 3. In this case, receptacle 502 includes a set of primary contacts 504 and secondary contacts 506 for each transformer module.

The configuration of FIG. 10 provides several advantages over a neon sign that uses a single transformer. For example, because several transformer modules are used, each of the transformer modules has a lower output voltage instead of one large, much higher voltage transformer. This improves the safety of the sign by reducing the voltages used to power the sign. Also, this configuration lends itself to applications that require more than one transformer such as applications in which the neon sign has multiple portions that function in different ways. This may include flashing portions or portions that may be only occasionally used such as a portion that indicates "open" or "no vacancy". This configuration also simplifies the job of servicing a complex neon sign that includes multiple portions because each portion may be powered by its own transformer module that can easily be replaced without effecting other portions of the sign.

The transformer module and receptacle of the invention may take on a wide variety of different shapes and specific configurations and still remain within the scope of the invention. The present invention would apply would equally apply to any of these variations configurations so long as the secondary contacts of the transformer module are deactivated any time that the transformer module is disconnected from the receptacle. For example, in a case in which a solid state transformer is being used and circuitry for detecting an open circuit is also included, this open circuit detection circuitry may be used to control a switch that provides the deactivation arrangement for deactivating the secondary contacts of the transformer module. However, this is not a preferred embodiment because, if the open circuit detection circuitry fails, it does not properly deactivate the secondary contacts of the transformer module when the transformer module is unplugged from the receptacle. This could result in an unsafe configuration. Additionally, if the open circuit detection circuit is used to deactivate the secondary contacts, the open circuit detection circuit must be reset every time that the transformer module is unplugged. This requirement must also be conveyed to the individual unplugging the transformer module or else they may interpret the transformer to have failed when it is plugged back in if they do not realize it needs to be reset.

Although the above described embodiments have been describe with the various components having particular respective orientations, it should be understood that the present invention may take on a wide variety of specific configurations with the various components being located in a wide variety of positions and mutual orientations and still remain within the scope of the present invention. For example, although the various contacts have been shown in certain positional relationships, these positional relationships are not a requirement of the invention so long as they are configured in such a way that the secondary contacts of the transformer module are deactivated when the transformer module is unplugged from the receptacle. Therefore, the present examples are to be considered as illustrative and not restrictive, and the invention is not to be limited to the details given herein, but may be modified within the scope of the appended claims.

What is claimed is:

1. A neon sign comprising:

a neon sign secondary contact;

a removable transformer module having a secondary contact configured to mate with the neon sign secondary contact; and an electrical deactivating arrangement for, upon removal of the transformer module from the neon sign and prior to the physical disengagement of the transformer secondary contact from the neon sign secondary contact, deactivating the secondary contact of the removable transformer module in response to and as a result of the removable transformer module being removed from the neon sign.

2. A neon sign according to claim 1 wherein the neon sign is configured to mate with a plurality of removable transformer modules, the neon sign includes a plurality of secondary contacts, the secondary contacts of the removable transformer module are configured to mate with associated ones of the plurality of secondary contacts of the neon sign as the removable transformer module is plugged into an associated portion of the neon sign thereby electrically connecting the secondary contacts of the removable transformer module to an associated portion of the neon sign.

3. A neon sign according to claim 1 wherein the removable transformer module includes a transformer capable of transforming a primary voltage into a secondary voltage of 1000 volts or greater and applying the secondary voltage to the secondary contact of the removable transformer module.

4. A method of replacing a first transformer on a neon sign having a neon sign secondary contact, the first transformer having a first secondary contact configured to mate with the neon sign secondary conatact, the method comprising:

providing a replacement transformer having a replacement secondary contact configured to mate with the neon sign secondary contact;

unplugging the first transformer from the neon sign, wherein the act of unplugging electrically deactivates the first secondary contact prior to the physical disengagement of the first secondary contact from the neon sign secondary contact; and plugging the replacement transformer into the neon sign.

5. A method according to claim 4 wherein the first transformer and the replacement transformer are capable of transforming a primary voltage into a secondary voltage of 1000 volts or greater.

6. A removable transformer module for use in a neon sign including a receptacle for receiving the removable transformer module, the receptacle being configured to mate with the removable transformer module as the removable transformer module is plugged into the receptacle in order to connect the removable transformer module to the neon sign, the receptacle including secondary contacts, the removable transformer module comprising:

a transformer for transforming a primary input into a secondary output having a voltage greater than the primary input;

secondary contacts for connecting the secondary output of the transformer to the neon sign when the removable transformer module is connected to the neon sign, the secondary contacts of the removable transformer module being configured to mate with the secondary contacts of the receptacle as the removable transformer module is plugged into the receptacle thereby electrically connecting the secondary output of the transformer to the neon sign; and at least a portion of a deactivating arrangement for deactivating the secondary contacts of the removable transformer module in response to and as a result of the removable transformer module being unplugged from the receptacle.

7. A removable transformer module according to claim 6 wherein the receptacle is configured to mate with a plurality of removable transformer modules, the receptacle includes a plurality of secondary contacts, the secondary contacts of the removable transformer module are configured to mate with associated ones of the plurality of secondary contacts of the receptacle as the removable transformer module is plugged into an associated portion of the receptacle thereby electrically connecting the secondary output of the transformer to an associated portion of the neon sign.

8. A removable transformer module according to claim 6 wherein secondary output of the transformer is 1000 volts or greater.

* * * * *